United States Patent [19]
Velasquez

[11] 3,797,578
[45] Mar. 19, 1974

[54] PLUG CATCHER FOR GREEN AERATOR

[76] Inventor: Alfredo Velasquez, 9038 Gorge Ave., Santee, Calif. 92071

[22] Filed: May 1, 1972

[21] Appl. No.: 249,185

[52] U.S. Cl............................ 172/22, 56/202, 37/124
[51] Int. Cl................................................ A01b 45/02
[58] Field of Search ................... 172/21, 22; 37/53; 56/327 A, 202; 171/63, 167

[56] References Cited
UNITED STATES PATENTS

| | | | |
|---|---|---|---|
| 2,088,209 | 7/1937 | Nolte | 172/22 X |
| 2,959,904 | 11/1960 | Ferris | 56/202 X |
| 3,007,263 | 11/1961 | Lair | 56/202 X |
| 3,134,118 | 5/1964 | Chouinard | 56/202 X |

Primary Examiner—Robert E. Pulfrey
Assistant Examiner—R. T. Rader
Attorney, Agent, or Firm—Roy L. Knox

[57] ABSTRACT

A plug catcher for temporary collection of the small plugs of turf as extracted by a turf-aerating machine, the catcher being characterized as particularly easy to attach and remove from the gleaning edge, that is, the front or leading edge, of the catcher only a small fraction of an inch from the ground, this distance being regulated effectively by locating this edge closely adjacent to the ground contact points of the rear supporting wheels of the aerator machine. The catcher is essentially a platform and is illustrated as having a wall making the same box-like and it is substantially balanced upon ground-contacting casters with the front end releasibly latched onto the axle of the aerator and dimensioned to extend below the axle, immediately to the rear of the aerator's plug extractors, so that the aforementioned gleaning edge brushes the grass of the fairway turf, being positively held in this turf-engaging position, to sweep the extracted plugs into the box-like enclosure of the catcher. Handling the aerator and catcher is ordinarily a two-man job and two axle-engaging latch hooks, one at each side, are provided for attaching and handling the catcher, which when loaded with extracted turf plugs is lifted from the aerator machine and ordinarily emptied into a truck or cart.

1 Claim, 3 Drawing Figures

PATENTED MAR 19 1974  3,797,578

PLUG CATCHER FOR GREEN AERATOR

BACKGROUND OF THE INVENTION

Aeration of golf course fairways and lawns by removal of cylindrical plugs of turf by mechanical aerator machines is a well accepted procedure. Some machines have receptacles for the plugs and others have deflectors which direct the extracted plugs into a window. Frequently the receptacles are not used in practice because of inefficient collection of plugs and/or awkward handling characteristics of these prior art collectors. In prior art aerators any receptors or collection bins generally analogous to the instant catcher are fixed to the aerator well above the ground. The result has been that a normal aeration procedure has been to allow free discharge of the extracted plugs onto the turf behind the aerator machine and the plugs are raked up and gathered into piles for loading into trucks. There exists a need, therefore, for a plug catcher which is convenient to use and which will efficiently collect the extracted plugs.

SUMMARY OF THE INVENTION

As claimed, the hereindisclosed catcher satisfies the above mentioned need. This catcher comprises essentially a table or platform, preferably equipped with walls on three sides, with one edge which in use is disposed immediately to the rear of the turf plug extractors of an aerator machine. The platform is balanced on ground-contacting casters with said one edge brushing the turf and this is accomplished by a pair of latch hooks preferably pivotally mounted on the lateral walls of the platform to latch over the rear ground-contacting wheel axle of the aerator machine, the leading edge of the platform being positively retained against rising out of the desired turf-engaging position by providing notches in the walls or attached blocks into which the axle of the aerator is placed so that the wheels of the aerator constitute a constant referencing of said leading edge to the turf level.

DETAILED DESCRIPTION OF A PREFERRED EMBODIMENT OF THE INVENTION

Figure 1:
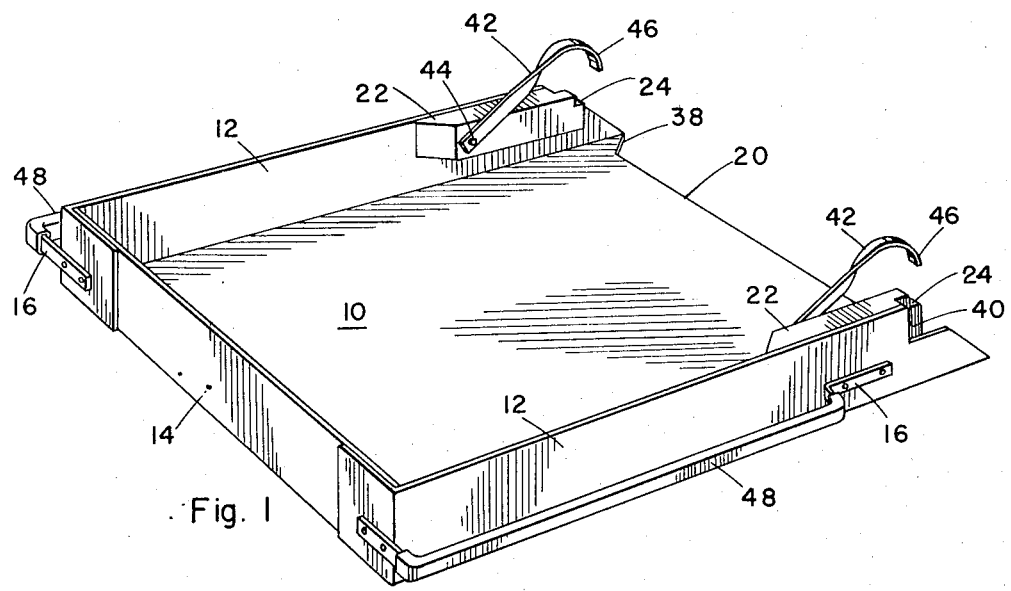
FIG. 1 is a perspective view of the catcher.
Figure 2:
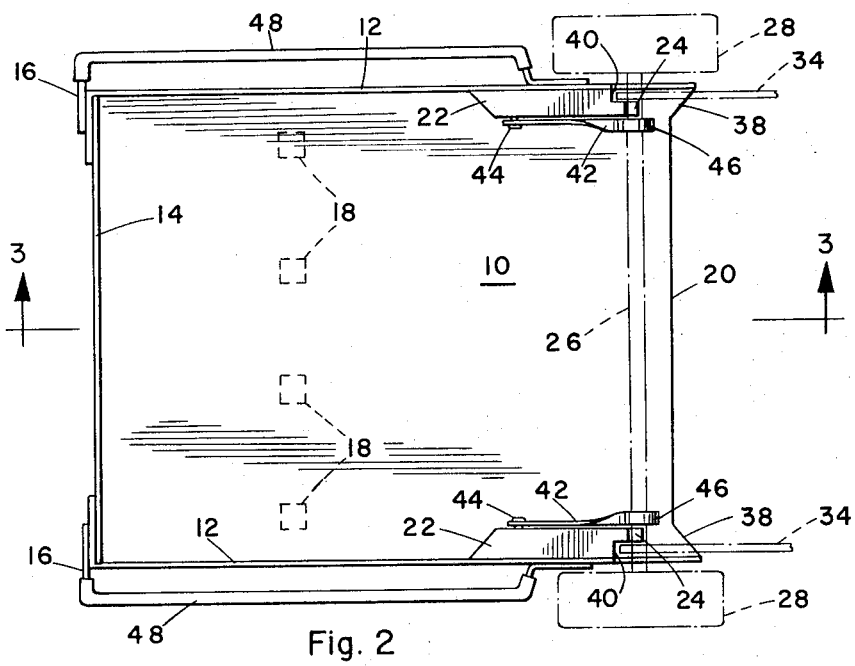
FIG. 2 is a top plan view, with a portion of an aerator indicated in broken line.
Figure 3:
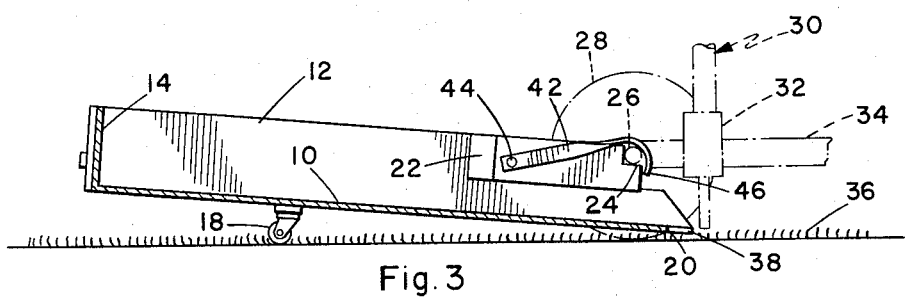
FIG. 3 is a sectional view taken on line 3—3 of FIG. 2.

As disclosed in the drawing the catcher comprises a flat table or platform 10 with upstanding lateral walls 12 and one end wall 14 which can be considered the rear wall. As originally conceived the platform and walls are unitary being constructed from a single section of reasonably rugged sheet metal the which should not be heavy in weight since the catcher is designed to be handled by two men, one on each side. To this end, a pair of rigid strap handles 16 are secured to the outside of the lateral walls 12, these handles being substantially coextensive in length with said lateral walls, thus enabling the handling and lifting of the catcher without tipping even when the load of turf plugs on the catcher is unbalanced.

However, the catcher is designed to be nearly balanced on its main supporting means represented as a plurality of casters 18 fixed on the underside of the platform 10, slightly rearwardly of center so that the front edge 20 dips downwardly. The forward end portions of the lateral walls 12 may be notched or a pair of blocks 22 may be rigidly secured to the inside surfaces of the lateral walls 12 as shown, these blocks having notches 24 to receive the axle 26 for the ground-contacting wheels 28 of the aerator machine indicated diagrammatically at 30 by a schematic representation of a plug extractor 32 and a frame member 34 of an aerator machine of the type proposed to be used with this invention. Since the axle 26 is seated in the notches 24 the front edge 20 cannot rise with reference to the level of the wheels 28 and it will be noted that this front edge 20 is substantially vertically beneath the notches so that the front edge is referenced to the ground contact point of the wheels, this being important since it is necessary for the front edge to brush the turf, in practice being spaced only approximately one-eighth of 1 inch from the soil, the grass 36 of the turf being deflected and the brushing, sweeping action of the catcher being thus assured.

At each end of the front edge 20 there are forwardly porjecting teeth-like portions 38 terminating at the forward ends of the lateral walls 12, this structure functioning to deflect the plugs inwardly of the catcher and being particularly useful in deflecting plugs away from the forward ends of the blocks 22. Frame members 34, in at least some aerators with which this invention is used, represent very effective lateral referencing means for the catcher and notches 40 in the blocks 22 receive the ends of these frame members and prevent the catcher from drifting.

Finally, the latch structure, which may be thought of an including the immediately above described notched blocks, necessarily includes latch hooks 42, or the equivalent, pivoted as at 44 to the blocks 22 and having hook ends 46 which engage the axle 26 and constitute easily releasible connection means retaining the catcher in tandem relation with the aerator machine.

To make the strap handles 16 gentler on the ahnds of the workmen lifting the loaded platform during use, it is preferred that flexible hoses 48 be inserted over the metal handles.

The operation of this invention will be obvious from a consideration of the foregoing description and abstract and it need only be mentioned that the materials used as well as the shape and size of the item, and even the mode of attachment contingent on the proper referencing to ground level being achieved, can all be varied considerably within the scope of the appended claims.

I claim:

1. A catcher for collecting plugs of turf as they are extracted by an aerator machine having turf plug extractors and a ground-contacting wheel axle closely adjacent to the extractors, said catcher comprising:
    a plug collector platform having upstanding peripheral walls except at one edge thereof;
    said walls having portions adjacent to said one edge with notches to receive said axle;
    Turf-contacting support means on the underside of said platform;
    latch means including hooks pivoted on said portions of the walls and capable of retaining said axle in said notches;

said latch means being capable of easily releasable connection with an aerator machine, such that said platform is immediately to the rear of the turf plug extractors of said machine; and said support means and said latch means together holding said platform in a position with said one edge of the platform in brushing contact with the turf so that the turf plugs are swept onto said platform as the aerator machine advances.

* * * * *